UNITED STATES PATENT OFFICE.

MATTHEW HIGHLEY, OF JERSEY CITY, NEW JERSEY, ASSIGNOR TO JOSEPH GLATZ, OF BROOKLYN, NEW YORK.

PROCESS OF RECOVERING GLYCERINE FROM SPENT SOAP-LYES.

SPECIFICATION forming part of Letters Patent No. 392,919, dated November 13, 1888.

Application filed July 14, 1888. Serial No. 279,974. (No specimens.)

*To all whom it may concern:*

Be it known that I, MATTHEW HIGHLEY, a resident of Jersey City, Hudson county, New Jersey, have invented an Improved Process of Treating Spent Soap-Lyes for the Recovery of Glycerine, of which the following is a specification.

The object of my invention is to recover glycerine from spent soap-lyes.

In carrying out my invention I proceed as follows: The spent soap-lyes are collected in a suitable tank or other receptacle, and caustic lime, baryta, alumina, or any earthy or metallic oxide or hydrate capable of combining with the soapy and fatty matters that are contained in the lye is added to it. In ordinary cases it will suffice to add about one-half pound of lime to about one hundred gallons of the lye. I now filter the lye containing the lime aforesaid in a filter-press to partially clear the lye from albuminous matters, fatty acids, &c. To insure the thorough removal of the fatty acids and the soapy and albuminous matters, I preferably again treat the lye with lime or one of its said equivalents in the same manner, and again filter as before. The lye is then drawn from the filter-press and heat applied to it to evaporate it partially, which I preferably do by boiling down to about 1.150 to 1.170 gravity. I then acidify the lye by adding muriatic or other acid to the lye in the proportion of from one to one and one-half per cent. of acid to the original bulk of the lye. Now I again filter the lye either by the filter-press or otherwise, thereby freeing the lye from any precipitate formed by the acid. I next draw off the lye and add to it caustic soda or other alkali in such proportion as to render the liquor faintly alkaline. Finally, I concentrate the lye to about 153° centigrade by boiling it, thereby evaporating more water, causing the salt which is carried in the lye to crystallize, and obtaining thereby crude glycerine fit for distillation without any other treatment.

Having now described my invention, what I claim is—

1. In the process of recovering glycerine from spent lyes, the improvement which consists in adding thereto lime, then filtering the lye containing the lime, then applying heat to evaporate part of the water contained in the filtered liquor, then adding acid to the liquor, then filtering the liquor again, then adding alkali, and, finally, concentrating the liquor, substantially as specified.

2. In the process of recovering glycerine from spent lyes, the improvement which consists in adding thereto lime and filtering the lye containing the lime to remove albuminous or soapy matters and fatty acids, then adding lime and filtering the liquor again, then applying heat to evaporate part of the water contained in the filtered liquor, then adding acid to the liquor, then adding alkali, and in then concentrating the liquor, substantially as specified.

MATTHEW HIGHLEY.

Witnesses:
ANTONIO KNAUTH,
THORNLEY DICKSON.